United States Patent [19]

Saidla

[11] 4,130,614
[45] Dec. 19, 1978

[54] METHOD FOR MAKING STRUCTURAL FOAMS WITH FACING SHEETS

[75] Inventor: Glen E. W. Saidla, Hampton Falls, N.H.

[73] Assignee: Exxon Research & Engineering Co., Florham Park, N.J.

[21] Appl. No.: 654,617

[22] Filed: Feb. 2, 1976

[51] Int. Cl.² .......................................... B29D 27/04
[52] U.S. Cl. ................................ 264/46.4; 264/45.3; 264/46.5; 264/46.7; 264/257; 428/313; 428/315; 428/298
[58] Field of Search ................... 264/46.5, 45.1, 45.3, 264/45.5, 46.2, 46.3, 257, 46.4, 46.7, 48, 51, 53, 54, 146; 312/214; 428/298, 313, 315

[56] References Cited

U.S. PATENT DOCUMENTS

| | | | |
|---|---|---|---|
| 2,727,278 | 12/1955 | Thompson | 264/46.4 |
| 2,728,702 | 12/1955 | Simon et al. | 264/46.7 X |
| 2,841,205 | 7/1958 | Bird | 264/146 X |
| 2,993,233 | 7/1961 | Hoppe et al. | 264/54 X |
| 3,082,486 | 3/1963 | Khawam et al. | 264/46.4 |
| 3,283,386 | 11/1966 | Cenegy | 264/46.5 X |
| 3,286,004 | 11/1966 | Hill et al. | 264/45.3 X |
| 3,382,302 | 5/1968 | Marzocchi | 264/54 X |
| 3,911,190 | 10/1975 | Myers et al. | 264/46.5 X |
| 4,005,919 | 2/1977 | Hoge et al. | 312/214 |

FOREIGN PATENT DOCUMENTS 856998  12/1960  United Kingdom ............... 264/328

*Primary Examiner*—Philip Anderson
*Attorney, Agent, or Firm*—Joseph J. Dvorak

[57] ABSTRACT

A method for forming a structural foam article having a cellular core, a high density integral skin with fiber reinforcement embedded therein, and exterior facing sheets so as to substantially avoid blistering of the facing sheets, is disclosed. The foam article is prepared by foaming an expandable resin composition between the fiber reinforcing material and facing sheets. The resin has a predetermined viscosity which is a direct function of the porosity of the reinforcing material and an indirect function of the foam initiation time.

12 Claims, 3 Drawing Figures

U.S. Patent  Dec. 19, 1978  4,130,614
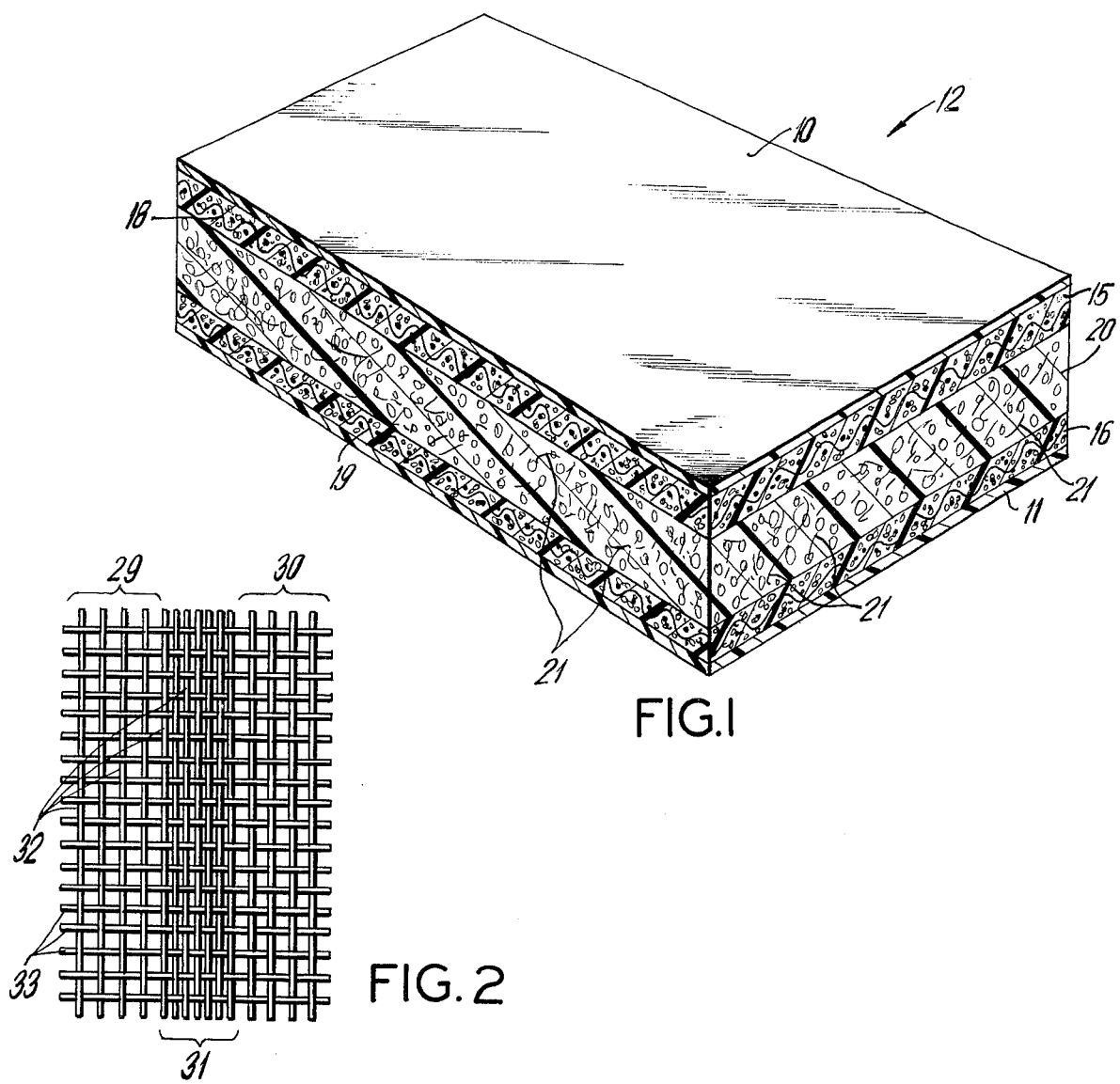
FIG.1
FIG.2
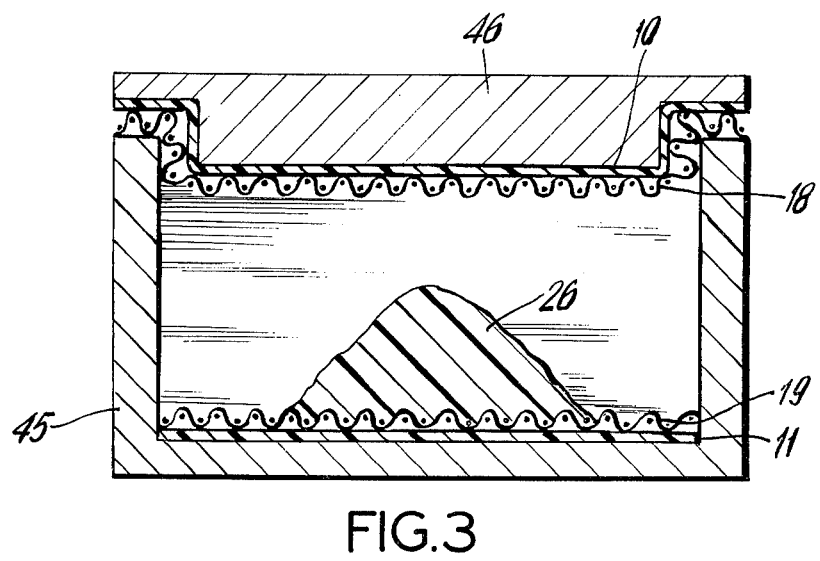
FIG.3

METHOD FOR MAKING STRUCTURAL FOAMS WITH FACING SHEETS

BACKGROUND OF THE INVENTION

The present invention relates to novel polymeric materials and is particularly concerned with rigid polymeric materials having a cellular core of a fiber-reinforced skin and a polymer film coating on the surface of the structure.

Rapid advances in polymer chemistry in recent years has led to an ever increasing use of synthetic materials for fabricating numerous types of structures which have heretofore been prepared from wood, metal, glass and like conventional materials. Reinforced polymers now, however, are used in a wide variety of structural applications. Indeed, laminates having a cellular core and outer layers of reinforcing sheets of materials adhesively bonded to the cellular core have gained considerable commercial attention because of their strength and weight characteristics.

As is readily appreciated in the art, the structural laminates which are fabricated by adhesively bonding various ply of laminae have strength characteristics which are limited to a considerable extent by the quality of the bond between the core and the skin. These materials mave shown a tendency over a period of time to delaminate when subjected to a great deal of flexural stress, thus shortening their useful life.

Attempts have been made to form structural laminates by foaming an expandable resin composition between sheets of reinforcing fibers such as glass fiber cloth or mats.

More recently, a method and apparatus has been developed for producing a fiber-reinforced foam article in which there are randomly oriented staple fiber filaments distributed throughout the foam in a predetermined concentration. When this fiber-reinforced foam is produced between woven fabrics, such as fiberglass fabric, substantial improvement in the mechanical strength of the foam results due to the "anchoring" of the fabric into the foam article by the randomly oriented fiber filaments. As a consequence thereof, this structural material or panel has gained wide acceptance because of its light weight and high strength. Indeed, the material has great utility in the production of light strong floors and partitions and especially in the construction of trailer truck bodies and the like.

In producing such fiber-reinforced foam structures, however, it is often highly desirable to provide the structural foam article with an exterior surface layer of film material, such as an acrylic plastic film material, to provide the article with a smooth and aesthetically pleasing surface. It would be particularly advantageous, when foaming the resin composition between layers of woven fabric, to be able also to place the plastic Film material in the mold so that a structural reinforced foam which has an attractive exterior finish is produced in a single step.

One area of difficulty associated with forming a foam article having an exterior layer of plastic film material and a layer of fiber-reinforcing sheet material is in providing an adequate bond between the exterior facing sheet and the foam. Another problem encountered is a blistering that occurs on the facing sheet. Indeed, blisters which develop on the facing sheet during the foaming step must then be sanded and the article resurfaced or repaired, otherwise the resultant foam article must be scraped. The need for resurfacing or the scraping of the article both are highly uneconomical. Consequently, there is a great commercial interest in developing a technique for foaming an expandable plastic composition between fiber-reinforcing skin material and facing sheets such that blistering of the facing sheet is substantially minimized if not totally avoided.

SUMMARY OF THE INVENTION

It has now been found that blistering of facing sheets typically occurring when an expandable resin composition is foamed in place in a mold so as to have at least a first layer of fiber-reinforcing sheet material and a second exterior layer of facing sheet can be avoided provided an expandable resin composition that has a predetermined viscosity which is a direct function of the porosity of the fiber-reinforcing sheet material and an indirect function of the foam initiation time, as hereinafter defined, for the resin system at a given temperature is employed.

In its simplest sense then, a fiber-reinforced foam article having at least one facing sheet and preferably two polymeric facing sheets, is prepared by allowing an expandable foam composition to foam in a mold provided with a facing sheet and fiber-reinforcing sheet material. Indeed, the expandable foam composition is deposited between layers of fiber sheet material and facing sheets in a mold and the composition is allowed to expand and completely fill the mold. The expandable composition is selected from compositions which are sufficiently viscous at the temperature at which the resin is loaded into the mold such that, if the expandable foam composition was placed on top of the fiber sheet material used in forming the article, and allowed to flow by gravity through the openings or voids in the fiber sheet material, the period of time in which beads of resin composition would appear on the underside of the fiber sheet material is greater than the foam initiation time for the resin composition. By foam initiation time is meant the time from which an expandable composition is prepared until foaming begins.

These and other embodiments of the present invention will become more apparent upon reading the detailed description of the invention which follows.

BRIEF DESCRIPTION OF THE DRAWINGS

FIG. 1 is a diagrammatic perspective illustration of an article formed in accordance with the present invention.

FIG. 2 is a top plan view of a preferred fiber-reinforcing sheet material used in forming a foam article in accordance with the present invention.

FIG. 3 is a diagrammatic illustration, in cross-section, of the filling of a mold with an expandable resin composition to form a foam article according to the present invention.

DETAILED DESCRIPTION OF THE INVENTION

FIG. 1 illustrates a preferred structure in accordance with the present invention. In FIG. 1 the structure is designated generally by the reference numeral 12. The structure 12 comprises a first facing sheet or skin 10 shown on the top of the structure and a second facing sheet or a skin 11 shown on the bottom of the structure. The foam structure 12 has an integral skin 15 of relatively high density foam on the upper surface of the structural material and an integral skin 16 of relatively high density foam on the lower surface of the structural material. Embedded in first and second integral skins 15 and 16 is fiber-reinforcing sheet material 18 and 19 in the form of woven fabric. The structural article 12 has a cellular foam core 20. The structural article 12 also has staple fibers 21 dispersed throughout the article. These staple fibers 21 are randomly oriented. Additionally, based on the weight of fibers to resin, these staple fibers 21 are substantially uniformly dispersed throughout the article. Since the density of the resin is greater in the integral skins 15 and 16, more of the randomly oriented fibers 21 appear in these skin areas than elsewhere in the article thereby serving to anchor the woven fabric material to the core.

Beneficially, structures in accordance with the present invention, such as structural element 12, are readily fabricated from a wide variety of foamable thermoset resins. Staple fibers 21 need not be dispersed throughout such structures, although it is highly preferred that such staple fibers be dispersed throughout such structures. Particularly contemplated, however, in the practice of the present invention is the formation of a fiber-reinforced foam resin having a low density core and a high density integral skin although any thermoset resin composition that may be foamed or expanded can be used in the practice of the present invention. Examples of suitable thermosetting resins that can be incorporated in foamable resin expanding compositions include phenolaldehyde resins, urea-aldehyde resins, epoxy resins and polyurethane resins.

The above-mentioned resins are readily prepared from commercially available polymer precursors by well-known techniques. For example, the polyurethane resins are prepared by polymerizing polyols and polyisocyanates; and polyesters are prepared by polymerizing polycarboxylic acids and polyols; phenolic resins are prepared by polymerizing phenols and aldehydes. Additionally, many of these resins are available in the form of prepolymers which, with the addition of a cross-linking or curing agent and/or suitable catalyst can be further polymerized into a plastic resin article. Thus, the monomers, polymers and prepolymer materials constitute a major component or precursor of a foamable resin composition. Cross-linking or curing agents constitute another major component of such resin compositions. For example, in the case of a polyester resin composition, one major component of the composition is a polycarboxylic acid such as a dicarboxylic acid and another major component is a polyalcohol such as a diol. In the specific case of a polyurethane, a polyisocyanate and a polyol each is a major component of the resin composition. Alternatively, a prepolymer such as a polyisocyanate prepolymer constitutes a major resin component and a polyol cross-linking or curing agent such as one based on sorbitol or succrose constitutes a second major component of the resin composition.

The resin compositions are rendered foamable by well known techniques. For example, a blowing agent may be added to or incorporated in the liquid resin composition. The blowing agent may be a compound which will liberate gas by chemical reaction upon heating or may be a liquid which will vaporize on heating or on the reduction of pressure to effect foaming. The blowing agent may even be a gas. Typical blowing agents include hydrocarbons such as pentane, fluorocarbons, solid gas liberating compounds such as azo and hydrazo compounds, carbonates and bicarbonates, and gases such as nitrogen and carbon dioxide.

Other ingredients which may be included in foamable resin compositions include catalysts, hardeners, plasticizers, foam stabilizer, color pigments, flame retardant and the like. These materials are all well known. For example, catalysts for polymerizing the resin monomers are those well known in the art and illustrated by amines, polyamines, tin salts, organic tin compounds and the like typically used to catalyze the polymerization of polyisocyanates and polyols to polyurethanes, and acids and bases typically used in forming polyesters, etc.

In the practice of the present invention, the choice of a specific resin as well as the formulation of foamable resin compositions will depend upon the use to which the foam is to be put. Indeed, it is well known that the characteristics of a foam resin, i.e. whether the foam is rigid or flexible, open or closed celled, skinless or with an integral skin, can largely be controlled by well known techniques involving chemical changes in the formulation, the chemical composition of the resin, and physical processing conditions. Moreover, there is an enormous selection of commercially available formulations of liquid systems that will provide an equally wide range of properties for the resultant foams. For example, rigid polyurethane foam systems are commercially available as two component systems. One component consists of the isocyanate component which typically is based on toluene diisocyanate or 4,4'-diphenylmethanediisocyanate. The second component contains polyol blends including catalyst, blowing agents, surface active agent and the like. Specific systems are chosen for the desired density, cell structure, rigidity, etc. of the resultant foam.

In addition to variations in formulations to effect foam density, skin formation, and other foam properties, the temperature of the molds and processing pressures, for example, can be modified to effect the formation of integral skins. These techniques also are well known in the art.

As indicated heretofore, it has been particularly desirable in the practice of the present invention that the foam composition be reinforced with fibrous materials. The fibrous phase which can be employed in the practice of the present invention is selected from a broad range of fibers, including materials such as glass, carbon, graphite, metal, boron fibers and the like; however, it is particularly preferred to use chopped glass fibers. These glass fibers can be almost any length; generally, however, they will not exceed 3 inches in length and indeed preferably they will range in length from about $\frac{1}{8}$ inch to 1 inch. These fibers can be chopped from individual filaments or bundles of fibers may be used. Typical glass fiber bundles which are commercially available consist of about 260 filaments per bundle and these fiber bundles are available in staple lengths.

The amount of fiber that is employed in the practice of the preferred embodiments of the present invention depends upon the fiber itself and the desired strength of the foam material being fabricated. For example, graphite fibers are known to impart considerable strength to plastic resins. Thus, less graphite fiber-reinforcing material will be required to reach a given strength than if glass fibers were employed. In general, however, the amount of fiber employed, based on the amount of resin foamed, is generally greater than 1%. Indeed, when glass fibers are used it is preferred to use from 10 wt. % to 50 wt. % of glass fibers based on the total weight of the foamed article. Within these parameters, of course, it is understood that mixtures of fibers can be employed where it is desired for reasons of strength and economy, etc. to use such mixtures.

The fiber reinforcing sheet materials can be selected from woven and non-woven fibers of glass, metal, cloth and the like; however, it is particularly preferred in the practice of the present invention to use woven fiberglass roving. Indeed, a typical type of woven fiberglass roving used in the practice of the present invention is type 30 textile yarn. Generally, the woven glass roving will have from about 3 to about 8 yarns per inch in the warp and about 3 to about 8 yarns per inch in the woof. Preferably the woven roving will have about 4 to 6 yarns per inch in the warp and 3 to 4 yarns per inch in the woof. When a non-woven fiber-reinforcing sheet material is used it is preferred that it have a porosity corresponding to that for the aforementioned woven glass roving.

In the practice of the present invention when forming relatively large structural foam articles, such as fiber-reinforced foam boards of about 4 feet wide by 40 feet long by ¼ inch and greater in thickness it is particularly preferred to use a fiber-reinforcing sheet material that has a predetermined gradation of void spaces or openings in the sheet material, the smallest voids or openings being in a center panel area of the sheet material corresponding generally to an area encompassing the center line of the article and the large voids between the yarns being at the outer extremeties or side panel areas. This is accomplished by numerous techniques. For example, the fabric can be woven with a greater number of yarns per inch in the warp in the center of the fabric than at the extremities. Alternatively, the diameters of the yarns used in the warp can be varied so that the fabric will have a graded porosity with the porosity increasing from the center outward. Additionally, the number of yarns per inch in the woof can also be varied; however, it is generally sufficient that the number of yarns per inch in the warp be varied to provide a less porous (i.e. more tightly woven) center panel area than the side panel areas.

A particularly preferred fiber-reinforcing sheet material is illustrated in FIG. 2. The sheet material is woven fiberglass roving. As can be seen in FIG. 2, the sheet material has two side panel areas 29 and 30 and a center panel area 31 therebetween. The porosity of the side panels is greater than the center panels by virtue of the greater number of yarns 32 per inch in the warp in the center than in the side panels. The number of yarns 33 per inch in the woof is substantially uniform.

Any type of facing sheet material can be employed so long as it is sufficiently adherent to the resin selected for the core. Thus, sheets of paper can be employed, such as kraft paper, for example, when phenolic resins are used for the core. Also, plastic materials are suitable. Indeed, acrylic film and polyvinylfluoride film can be used in conjunction with polyurethane type foam materials. It is especially preferred in the practice of the present invention to use a polyvinylfluoride film with a polyurethane foam resin system for the core. Typically, these facing sheet materials are substantially non-porous.

In any event, using woven fiberglass roving and polyurethane resin for illustration, the process is now described with reference to FIG. 3. A mold such as mold 45 having the desired dimensions is first lined with bottom facing sheet 11. Optionally, the facing sheet can be placed in mold 45 such that facing sheet 11 extends not only along the bottom of mold 45 but also up the side walls; this, however, is not necessary nor preferred. The facing sheet 11 is a polymeric film material such as polyvinylfluoride film. Next, a layer of fiber-reinforcing material such as woven fiberglass roving 19 is placed on top of the facing sheet 11. Thereafter, an expandable resin composition such as a foamable polyurethane resin composition 26 is placed in the mold. The amount of expandable composition 26 is sufficient so that upon expanding it will completely fill the mold. Immediately after the resin composition 26 is placed in the mold, optionally and preferably, an additional sheet of reinforcing fabric 18 is placed over the resin composition 26. Placed on top of the sheet of reinforcing fiber sheet material 18 is placed a surfacing sheet 10 of polymeric film. Most conveniently, sheets 18 and 10 can be wrapped on the underside of platten 6 so that they will be in proper position when platten 6 is put in place. After placing the platten to close the mold, the mixture is allowed to foam and cure.

In order to avoid the blistering phenomena that most frequently occurs in foaming an expandable resin composition in the manner set forth above, it is critical that the foamable resin composition 26 have a predetermined viscosity relative to the foam initiation time for the resin system and the spaces or voids between the fibers of the fiber-reinforcing layer. Specifically, the resin composition under conditions in which it is loaded into the mold should be such that the resin would not pass by gravity through the openings or spaces between the fibers or yarns of the fiber-reinforcing sheet material and form beads on the underside thereof in a time shorter than the foam initiation time. In other words, the expandable resin composition should not be able to drip through the fiber sheet material in a time shorter than the foam initiation time. The foam initiation time refers to the time that it takes for an expandable foam composition to begin to foam after the combining or mixing of the expandable foam composition components. For example, in a two part polyurethane foam system, blowing agent and catalyst may be combined with the polyol part of the system. The time that it takes from the beginning of mixing of the polyol part of the system with the polyisocyanate part of the system until foaming starts is the foam initiation time described herein. The start of foaming is most easily detected by a change in volume of the foamable composition. It should be noted that cream time is sometimes defined to indicate the time period in which foaming of a resin system begins but sometimes cream time refers to the time when the resin system becomes creamy. Therefore, foam initiation time as defined herein is used in practicing the present invention.

As stated supra, the foamable resin composition must have a predetermined viscosity relative to the foam initiation time and the porosity of the fiber-reinforcing sheet material. A very simple test in determining whether the viscosity of the resin is adequate merely involves stretching the fiber-reinforcing sheet material over an open container and placing the resin composition without the catalyst on top of the fiber filaments. The time in which it takes the resin material to begin to form beads on the underside of the fiber filament, hereinafter referred to as the drip time, has to be longer than the foam initiation time of the resin composition if the blistering phenomena is to be avoided in forming structural foams in accordance with the present invention.

Thus, the greater the porosity of the reinforcing sheet material, e.g. the wider the weave when woven fiberglass is used, the greater the viscosity of the resin system. Similarly, the less the porosity such as with a tighter weave fabric, the less viscous the resin composition has to be.

In using a fiber-reinforcing sheet material that has a graded porosity, it is generally sufficient that the drip time be measured on the least porous portion of the fiber-reinforcing sheet material as long as the foamable resin composition is charged in the mold on the least porous portion of the fiber-reinforcing sheet material.

The viscosity of the resin, of course, can be adjusted by well known techniques such as controlling temperature, using additives, and the like. As a general rule of thumb, with most woven roving type style yarn used as fiber-reinforcements, the viscosity of the resin composition should be greater than about 1500 centipoises. In general, the rise time of the resin system employed should not be less than 1½ minutes and generally the rise time should not be greater than 1¾ minutes. The rise time, of course, refers to the time in which it takes for 100 grams of resin to foam and rise to the top of a 2195 Dixie cup (32 oz.).

While not wishing to be bound by any theory, it is believed that by selecting material with viscosity properties in accordance with the present invention, the blistering phenomena is avoided since air is not entrapped by resin within the apertures between the yarns of the fiber-reinforcing material since the resin does not drip through these apertures. Indeed, the resin is forced through the voids in the fiber-reinforcing material by the internal pressure generated as the resin foams and fills the mold. As a consequence thereof, apparently all of the air within the mold is forced outwardly from the point where the resin is placed in the mold, for example, from the center of the mold to the edges. Thus, there is no resin blocking the progress of air to the edges of the mold where it can escape.

In any event, blister free structural panels having fiber-reinforced integral skins with polyvinylfluoride surfaces have been prepared in accordance with the present invention. Indeed, structural foam panels in widths of 10 feet by 45 feet in length and from ¼ inch up to 4 inches in thickness have been formed blister-free in a "one shot" operation.

The foregoing description of the preferred embodiment is for illustration and explanation of the invention and shall not be construed to limit the scope thereof which is defined by the claims which follow.

What is claimed is:

1. In forming a fiber-reinforced structural foam having an exterior layer of a substantially nonporous film material on at least one surface thereof and adherent to said foam by foaming a foamable resin composition in place in a mold first lined with an exterior layer of said film material and next with a first layer of fiber-reinforcing sheet material whereby after the resin composition foams the resulting foam is bonded to the facing sheet without adhesive, the improvement consisting essentially of: charging in the mold on said fiber-reinforcing sheet material a foamable resin composition for foaming therein, said resin composition being charged in an amount sufficient to fill the mold on foaming, and said resin composition having a viscosity prior to foaming such that under the conditions in which the resin composition is charged into the mold the resin would not flow by gravity through the openings between the fibers in the fiber-reinforcing material and form beads on the underside thereof in a time shorter than the foam initiation time; and allowing said resin composition to foam in place and completely fill the mold whereby a fiber-reinforced structural foam having a facing sheet on at least one surface is obtained.

2. The improvement of claim 1 wherein the viscosity of the resin at the time of charging the mold is greater than about 1500 centipoises and the fiber-reinforcing material is style 30 woven glass roving with from about 3 to about 8 yarns in the warp and from 3 to about 8 yarns in the woof.

3. A method of forming a fiber-reinforced structural foam consisting essentially of:
  (a) placing a sheet of polymeric film selected from acrylic film and polyvinylfluoride film in a mold and then;
  (b) placing a sheet of fiberglass reinforcing sheet material in the mold on top of the facing material;
  (c) placing a polyurethane foamable resin composition in the mold on said fiberglass reinforcing sheet material for foaming in place therein, said foamable resin composition being sufficiently viscous prior to foaming such that the drip time of the resin is greater than the foam initiation time; and
  (d) allowing the resin to foam thereby forming a fiber-reinforced structural foam article having a facing sheet which is blister free.

4. The method of claim 3 wherein a second sheet of fiberglass reinforcing sheet material is placed in the mold on top of and after the resin is placed in the mold and wherein a second sheet of polymeric film is placed on top of said second sheet of fiberglass reinforcing sheet material.

5. The method of claim 4 wherein the fiber-reinforcing sheet material has a center panel area and two side panel areas and has openings between the fibers in a center panel area of the sheet which is less than the openings in the side panel areas.

6. The method of claim 5 wherein the fiberglass reinforcing sheet material is woven.

7. The method of claim 3 wherein the facing sheet material is polyvinylfluoride.

8. The method of claim 7 wherein the foamable resin composition has a viscosity greater than about 1500 centipoise.

9. A method of forming a structural foam board having a cellular foam core and integral skins of relatively high density foam on two major surfaces of the board, said integral skins having a fiber-reinforcing sheet material embedded therein, said foam board having facing sheet material on the exterior of the two major surfaces, said method consisting essentially of: foaming in place in said mold an expandable polyurethane resin composition between the two layers of said fiber-reinforcing sheet material and the facing sheet material, said fiber-reinforcing sheet material being fiberglass sheet material and said facing sheet material being a substantially nonporous polymeric film material which is capable of adhering to said polyurethane resin composition, said resin composition having a viscosity prior to foaming and under the conditions in which it is loaded into the mold such that said resin would not flow by gravity through openings between the fibers in the fiber-reinforcing sheet material and forming beads on the underside thereof and in a time less than the foam initiation time.

10. A method of forming a structural foam board consisting essentially of:

(a) placing a sheet of plastic film sheet facing material in a mold, said plastic film sheet material being selected from acrylic and polyvinyl films;

(b) placing a sheet of woven fiberglass roving in the mold on top of the facing sheet material, said fiber-reinforcing sheet material being a style 30 woven glass roving with from about 3 to about 8 yarns in the warp and from about 3 to about 8 yarns in the woof;

(c) placing an expandable resin composition for foaming in place in the mold, said resin being placed on top of the reinforcing woven fiberglass roving in an amount sufficient to fill the mold upon foaming, said resin composition being sufficiently viscous prior to foaming and under the conditions in which the resin composition in loaded into the mold such that foam initiation time is less than the time the resin can flow by gravity through the woven roving and form beads of resin on the underside thereof;

(d) covering the resin composition with a second layer of woven fiberglass roving and then a second layer of plastic film sheet facing material;

(e) placing a platen over the mold; and (f) allowing the resin to foam thereby forming a fiber-reinforced foam board having facing sheets which are blister free.

11. The method of claim 14 wherein said fiberglass roving has openings between the fibers thereof which is graded with the openings increasing from the center area of the woven fiberglass to its outer extremities and wherein the resin is placed so as to substantially coincide with the center area of the woven fiberglass.

12. In the method of forming a structural polyurethane foam board by foaming an expandable polyurethane resin composition between sheets of woven fiberglass roving and polyvinyl fluoride plastic film sheet material exterior the woven fiberglass roving, the improvement consisting essentially of: charging an expandable polyurethane resin composition between the sheets of woven fiberglass roving in a mold in an amount sufficient to completely fill the mold upon foaming, said woven fiberglass roving having two side panel areas and a center panel area therebetween, the openings between the fibers of the roving in the side panel areas being greater than the openings between the fibers in the roving in the center area, said resin being placed between the sheets in the center area, said resin composition prior to foaming having a drip time relative to the center area of woven fiberglass roving which is greater than the foam initiation time of the resin composition; and allowing the resin to foam.

* * * * *